United States Patent Office 3,458,277
Patented July 29, 1969

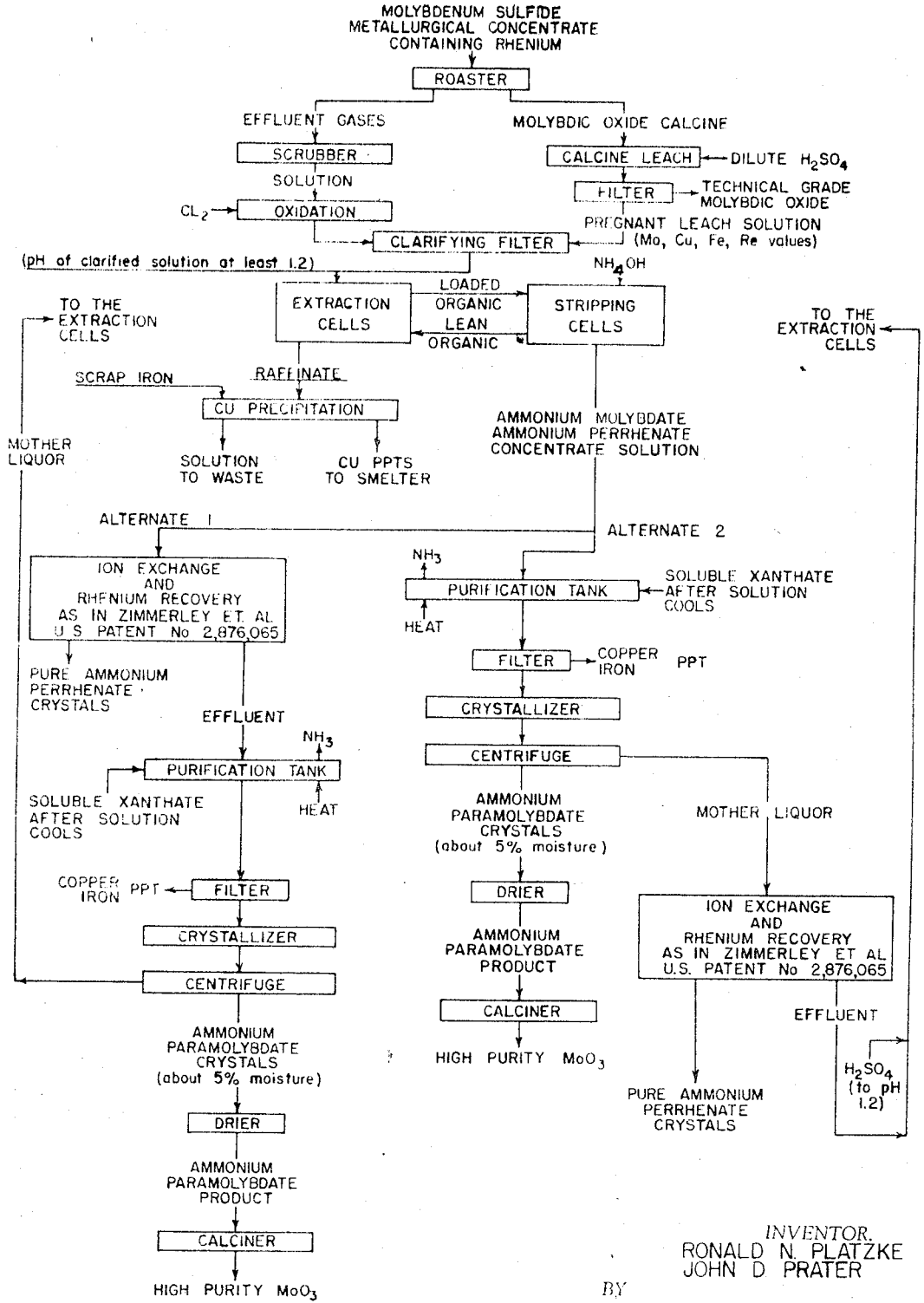

3,458,277
PROCESS FOR THE RECOVERY OF MOLYBDENUM VALUES AS HIGH PURITY AMMONIUM PARAMOLYBDATE FROM IMPURE MOLYBDENUM-BEARING SOLUTIONS, WITH OPTIONAL RECOVERY OF RHENIUM VALUES IF PRESENT
Ronald N. Platzke and John D. Prater, Salt Lake City, Utah, assignors to Kennecott Copper Corporation, New York, N.Y., a corporation of New York
Filed July 21, 1966, Ser. No. 566,789
Int. Cl. C01g 39/00, 47/00
U.S. Cl. 23—22                                6 Claims

ABSTRACT OF THE DISCLOSURE

A process for recovering molybdenum values, and rhenium values if present, from a pregnant acidic leach solution containing molybdic and rhenium values in their highest valence state derived from relatively impure molybdic oxide calcine containing at least trace amounts of copper and iron, including the steps of extracting the molybdenum and rhenium values from the pregnant leach solution with an amine-based extracting solution, stripping the values from the extract with an ammonium compound, precipitating residual copper and iron impurities from the extracted molybdenum and rhenium, extracting the rhenium values, if present, and crystallizing the resulting ammonium paramolybdate in substantially uncontaminated form.

---

This invention is concerned with recovering the molybdenum and copper ordinarily lost when leaching copper and iron impurities from molybdic oxide calcine in producing technical grade molybdic oxide from molybdenum sulfide metallurgical concentrates, and is also concerned with recovering the very small amount of rhenium present in the molybdic oxide calcine when the molybdenum sulfide metallurgical concentrates contain rhenium.

A principal object of the invention is to recover the molybdenum as ammounium paramolybdate, which is a readily soluble product and which can be calcined, if desired, to produce a high purity molybdic oxide.

It is normal practice to subject molybdenum sulfide metallurgical concentrate, as separated from copper sulfide metallurgical concentrate in the milling of various types of low grade copper sulfide ores, to a roasting operation for converting the sulfide to oxide in the production of molybdic oxide as a final commercial product. When rhenium is present in the concentrate being roasted, much of it is volatilized and passes out with the flue gases. Some of it may condense and settle with the flue dusts.

It is now common practice to treat the flue dusts for recovery of rhenium. However, much of all the rhenium that is volatilized during the roasting operation can be recovered by use of the Zimmerley et al. process of U.S. Patent No. 2,809,092, issued Oct. 8, 1957, entitled "Extraction of Rhenium Incidental to Manufacture of Molybdenum Oxide."

Despite these procedures, small amounts of rhenium and considerably larger amounts of copper and iron are normally present in the molybdic oxide calcine as impurities. It is highly desirable to remove both copper and iron from the calcine in order to obtain technical grade molybdic oxide, which is a readily soluble product, and, although the quantity of rhenium left in such calcine (where rhenium is present in the molybdenum sulfide concentrate subjected to the roasting operation) is ordinarily extremely small, it is desirable from an economic standpoint to recover as much as possible of that which is present.

This invention provides a process for effectively and economically removing practically all of the copper, iron, and molybdenum values from the leach solution used to upgrade the molybdic oxide calcine to technical grade, and to do so in a manner permitting separation and ultimate recovery of the copper and molybdenum values present in such solutions. It also provides for separating and recovering practically all of the rhenium values when such values are present.

In accordance with the invention, the molybdic oxide calcine is first subjected to a conventional leaching operation with a dilute mineral acid, A solution of sulfuric acid is preferred, because of its availability, low cost, and favorable action. However, other mineral acids can be employed. As is well recognized by those skilled in the art of leaching, acid concentration should be held within limits, so as to obtain maximum extraction of copper and iron within a reasonable time period and only minimum dissolution of molybdenum.

The acid leach will inevitably dissolve some molybdenum values, as well as the copper, iron and rhenium values. The invention is concerned with separating such values from from the leach solution and from each other.

We have found that the weekly acid leach solution, pregnant with copper, iron and molybdenum values, and with rhenium values, if rhenium is present, can be successfully treated by a solvent extraction procedure to extract the molybdenum and rhenium values, leaving the copper values to be subsequently recovered from the solution by some acceptable procedure, such as precipitation on metallic iron. Only the soluble iron goes to waste with the depleted solution. However, since the content of rhenium values is so small, a feature of the invention where the recovery of rhenium is a factor is the recovery of volatized rhenium values from the effluent gases of the roasting step by aqueous scrubbing of such gases and the mixing of the scrubber solution so derived with the pregnant acid leach solution prior to treatment of the latter. This makes it possible to effectively treat the acid leach solution for the recovery of contained rhenium values and to incidentally recover any molybdenum values contained thereby.

A feature of the invention is the manner in which the loaded organic phase of the solvent extraction procedure is stripped of molybdenum values and the manner in which the resulting concentrate stripping solution is treated to purify it prior to recovery of the molybdenum values therefrom as ammonium paramolybdate.

It can be seen that, from one standpoint, the invention involves a combination of procedural steps, some of which are old per se, and that, from another standpoint, it involves certain new processing procedures applied to existing feed materials.

The accompanying drawing illusrates preferred procedures in the overall process and represents the best mode presently contemplated by us for carrying out the invention.

In the drawing, the single figure is a flow sheet showing the invention applied to the treatment of a molybdenum sulfide metallurgical concentrate in the production of technical grade molybdic oxide as a major objective. The invention provides for the elimination of copper and iron and for the recovery of copper and rhenium and such molybdenum values as are inevitably removed from the molybdic oxide product in upgrading it to the commercially acceptable technical grade.

Referring to the drawing:

As illustrated in the flowsheet, a molybdenum sulfide metallurgical concentrate containing rhenium is fed to a conventional roaster, where roasting converts the molybdenum sulfide to molybdic oxide with evolution of gases containing volatilized rhenium. The gases are passed through a scrubber in conventional manner for recovery of volatilized rhenium, and the flue dusts may be collected and treated from time to time in conventional manner (not indicated) as may be appropriate.

The molybdic oxide calcine is leached in conventional manner with dilute solution of a mineral acid, preferably $H_2SO_4$ previously indicated, resulting in a leach solution pregnant with molybdenum, copper, iron, and some rhenium values.

Following oxidation of the scrubber solution by adding thereto some oxidant, such as hydrogen peroxide, chlorine, calcium hypochlorite, etc., for converting both the molybdenum and rhenium values contained therein to their highest valence states, and after first filtering the leached slurry to remove the solution containing the copper, iron, and rhenium impurities from the molybdic oxide product, the two solutions are combined and filtered to provide the heading solution for a solvent extraction step designed to extract the molybdenum and rhemium values to leave the copper, iron, and various other impurities in the raffinate solution.

Solvent extraction is carried out in customary manner using customary apparatus and an organic solvent. If the heading solution is above pH 1.2, sufficient acid is added to lower the pH to at least 1.2.

As is well known, a tertiary amine is an excellent organic solvent for the purpose, we have found by tests in the laboratory that it can be used very effectively in a one to one ratio, by volume, with the solution when mixed with a long chain alcohol and kerosene, for example, in the proportions by volume of 5% amine, 5% alcohol, and 90% kerosene. For best results, the alcohol should be one in which water is not even slightly soluble, tridecyl alcohol being much better than primary decyl alcohol. It should be realized that the ratio of organic solution to aqueous solution is determined largely by the concentration of molybdenum in solution. Moreover, the amine can be loaded with from 12 to 15 grams per liter of molybdenum, but ordinarily no higher, without resulting in emulsification in the organic phase.

Some of the tertiary amines are better than others from the standpoint of recovery and because some have a greater tendency to produce an organic molyamine complex when loaded with molybdenum values to a high level. Secondary amines are not favored becauuse they have a relatively high degradation rate. A commercial amine solvent showing a high molybdenum loading is a trilauryl amine, which is available from its manufacturer, General Mills Company, under the proprietary name of "Alamine 304." Other tertiary amines yielding almost the same results are Adogen 363, 368, and 383, all tertiary amines manufactured by Archer Daniels Midland Company. A secondary amine capable of high loading and showing good phase separation is LA2 manufactured by Rohm and Haas.

In the laboratory tests in which these amines were used, the feed solution analyzed 13.2 g./l. Mo, 4.0 g./l. Cu, pH 1.5, and the ratio of solution to solvent was one to one by volume.

Following the solvent extraction stage, the raffinate, containing the copper values along with iron and other impurities associated with the molybdenum and rhenium values in the heading solution, is treated for copper recovery. Cementation or precipitation on metallic iron is advantageously employed, the precipitate copper going to a smelter for refining.

The loaded organic solvent is passed to a conventional stripping stage for removal of the molybdenum and rhenium values picked up in the extraction stage, utilizing a basic solution of an ammonium compound as the stripping solution. The particular stripping solution utilized is preferably a 10% ammonia ($NH_3$) as ammonium hydroxide ($NH_4OH$). In laboratory and pilot plant work, this has always resulted in an analysis of less than 0.1 grams per liter molybdenum in the stripped organic solvent solution.

The concentrate solution, containing the molybdenum and rhenium values as ammonium molybdate and ammonium perrhenate, is advantageously handled in either one of two ways shown as alternates on the flowsheet.

As indicated in Alternate 1, the concentrate solution is preferably first treated for the separation of the rhenium and molybdenum values and then for the production of highly pure ammonium paramolybdate crystals. This separation and recovery of the rhenium values is preferably accomplished by the ion exchange and rhenium recovery procedures set forth in Zimmerley et al U.S. Patent No. 2,876,065, with the effluent from the ion exchange columns being treated for the production of ammonium paramolybdate crystals of high purity. As shown, molybdic oxide of high purity can be obtained if desired by merely calcining the ammonium paramolybdate crystals.

The preferred procedure for obtaining these ammonium paramolybdate crystals is to run the effluent into a purification tank, and to heat it therein to precipitate and coagulate iron impurities and to boil off some of the ammonia. After cooling, a soluble xanthate, e.g. sodium or potassium xanthate, is added in stoichiometric amount equivalent to the copper in solution, which precipitates substantially all remaining copper as copper xanthate.

Following filtration, with the solid residue (as filter cake) normally going to waste, the purified solution is passed through suitable crystalizing apparatus, such as an evaporator, and is then centrifuged or otherwise treated to separate the crystallized ammonium paramolybdate from the mother liquor. The crystals thus obtained contain about 5% moisture, and are passed through a drier to produce the final ammonium paramolybdate product, which may be calcined, if desired, to yield molybdic oxide of high purity. The mother liquor from the centrifuge is recycled to the extraction cells of the solvent extraction stage of the process.

The other procedure (Alternate 2) reverses the steps by first purifying the ammonium molybdate—ammonium perrhenate concentrate solution, to eliminate residual copper and iron, and by then using the mother liquor from the ammonium paramolybdate crystallizer as feed for the ion exchange step. The effluent from ion exchange is treated by the addition of a mineral acid to lower its pH to at least 1.2, if need be, and is recycled to the extraction cells of the solvent extraction stage.

The procedure of Alternate 1 is preferred to avoid any incidental losses of rhenium while going through the purification and paramolybdate-producing steps. However, the other procedure of Alternate 2 has the advantage of considerably less volume of solution to be run through the ion exchange columns.

By these procedures, in excess of 98 percent of both the molybdenum and rhenium present in the heading solution is recovered, and, by reason of the purification stage prior to crystallization of ammonium paramolybdate, copper content is practically eliminated with only a very small molybdenum loss, e.g. 0.3%. Typical analyses of the ammonium paramolybdate crystals, utilizing various organics for the solvent extraction stage, are as follows:

TABLE 1.—ANALYSES OF AMMONIUM MOLYBDATE CRYSTALS

| Concentration, percent | Adogen 383 Product | Adogen 368 Product | Adogen 363 Product | Alamine 304 Product |
|---|---|---|---|---|
| Aluminum | .002 | <.001 | <.001 | <.001 |
| Arsenic | .005 | .001 | .001 | .001 |
| Bismuth | <.0002 | <.0005 | .001 | .0005 |
| Calcium | .001 | | | |
| Chromium | <.0002 | .0005 | <.0005 | <.0005 |
| Copper | .001 | .0005 | .0005 | <.0005 |
| Iron | .004 | .01 | .0008 | .0007 |
| Magnesium | <.0005 | .0005 | .0005 | .0005 |
| Nickel | .0005 | .0005 | <.0005 | <.0005 |
| Lead | <.0005 | .0005 | .0005 | .0005 |
| Silicon | .01 | >.02 | .01 | .005 |
| Tin | <.0005 | <.0005 | <.0005 | <.0005 |
| Titanium | .0007 | .0008 | .0005 | .0005 |

It should be realized that, when recovery of rhenium values is not a concern for any reason, the ion exchange and subsequent rhenium-recovery procedures are eliminated altogether and no selection between the two alternates is involved. Moreover, under such circumstances, the only feed to the solvent extraction stage will be the pregnant leach solution.

In the following examples, the molybdenum and rhenium in the combined scrubber and pregnant leach solutions were oxidized to their highest valence states with hydrogen peroxide prior to contacting with the organic solvent. If it was found to be necessary, sulfuric acid was added to decrease the pH to 1.2 or lower. The organic solvent used in each example was 5 percent by volume Adogen 383 in kerosene with 5 percent by volume tridecyl alcohol as modifier.

Example I

Flue gas scrubber solution from pilot plant roasting of molybdenite concentrate from the Nevada Mines Division of Kennecott Copper Corporation and a mixture of 50 percent by volume scrubber solution and 50 percent by volume molybdenum oxide calcine leach solution were compared by contacting each in laboratory tests with 1:1 ratio by volume of the organic extractant. The following results were obtained:

| Solution Composition | Feed Solution, g./l. | | Raffinate, g./l. | | Extraction, percent | |
|---|---|---|---|---|---|---|
| | Mo | Re | Mo | Re | Mo | Re |
| 100% scrubber | 0.49 | 1.13 | 0.01 | 0.007 | 98.0 | 99.4 |
| 50% scrubber, 50% calcine leach | 9.10 | 0.53 | .04 | .006 | 99.6 | 98.9 |

It can be seen that excellent recoveries of molybdenum and rhenium were achieved in both of these tests.

Example II

Another sample of gas scrubber solution assaying 1.24 grams rhenium per liter and 1.20 grams molybdenum per liter was mixed with five times the volume of a calcine leach solution, resulting in a combined solution assaying 0.18 grams rhenium per liter, 19.2 grams molybdenum per liter, and 9.2 grams copper per liter. The solution was contacted with the organic solvent. Extraction was made in two stage countercurrent contact with an aqueous to organic ratio of 1:1.5 and mixing time of five minutes per stage. The extracted molybdenum and rhenium values were stripped from the organic solution with 10% ammonia solution in one stage with an aqueous to organic ratio of 1:7. Results were as follows:

| Solution | Analysis, grams per liter | | Extraction in organic, percent | |
|---|---|---|---|---|
| | Mo | Re | Mo | Re |
| Heading | 19.2 | 0.18 | | |
| Raffinate | 0.03 | 0.0005 | 99.7 | 99.7 |
| NH$_3$ Stripping Sol'n | 78.5 | 0.73 | | |

As indicated, molybdenum and rhenium extraction from the aqueous solution by the organic solvent was nearly complete. The extracted molybdenum and rhenium values were completely removed from the organic solution with 10% ammonia solution.

Example III

Continuous tests were made with oxidized gas scrubber solutions and calcine leach solutions in laboratory, mixer-settler, three stage, countercurrent extraction equipment. The loaded organic solution was stripped of its molybdenum and rhenium values by a 10% ammonia solution and recycled to the stripping stage. The aqueous solution was fed at 25 milliliters per minute and organic solution was fed at 10 milliliters per minute, with the following results:

| Test No. | Feed Solution analysis, g./l. | | Raffinate analysis, g./l. | | Extraction, percent | |
|---|---|---|---|---|---|---|
| | Mo | Re | Mo | Re | Mo | Re |
| 1 | 0.73 | 0.75 | 0.06 | 0.001 | 91.8 | 99.9 |
| 2 | 0.75 | 0.68 | 0.04 | Nil | 94.7 | 100 |

Example IV

Continuous pilot plant tests were made in 2-stage extraction, 2-stage stripping Denver Equipment Company mixer-settler equipment. Undiluted gas scrubber solutions and a mixture of 1 volume scrubber solution and 4 volumes calcine leach solution were used as feed solution. The loaded organic solution was stripped with 10% ammonia solution and recycled to the extraction circuit. Results were as follows:

| Heading solution | Heading analysis, g./l. | | Feed rate, ml./min. | | Recovery, percent | |
|---|---|---|---|---|---|---|
| | Mo | Re | Aqueous | Organic | Mo | Re |
| Gas scrubber | 0.98 | 1.43 | 325 | 550 | 95.0 | 99.8 |
| Gas scrubber-calcine leach | 5.44 | 0.286 | 625 | 550 | 93.0 | 98.5 |

Example V

A solvent extraction stripping solution assaying 78.5 grams molybdenum per liter and 0.73 grams rhenium per liter was evaporated and successive batches of crystals recovered and analyzed. Distribution of molybdenum and rhenium in the crystals and final mother liquor were as follows:

| Product | Distribution, percent | |
|---|---|---|
| | Mo | Re |
| Crystals: | | |
| 1 | 10.4 | <0.1 |
| 2 | 26.6 | 23.4 |
| 3 | 28.3 | 11.7 |
| 4 | 24.9 | 56.7 |
| Mother liquor | 9.8 | 8.1 |

Example VI

In tests with continuous bleed off of crystals and continuous feed to a laboratory crystallizer, improved selective crystallization was achieved. Heading solution assayed 64.5 grams molybdenum per liter and 0.86 grams rhenium per liter. Data from these tests indicated that 24.2 percent of the molybdenum and 2.1 percent of the rhenium was recovered in the ammonium molybdate crystals removed from the circuit. The circulating mother liquor assayed 196 grams molybdenum per liter and 3.50 grams rhenium per liter.

Example VII

A liter of solution containing 10.0 grams rhenium per liter and 15.5 grams molybdenum per liter was used as feed solution to an ion exchange column (Amberlite IRA-400, Rhom and Haas). Following adsorption, the resin was rinsed with sodium hydroxide to remove molybdenum and was then rinsed with perchloric acid to recover rhenium, as in Zimmerley et al. U.S. Patent No. 2,876,065. Distribution of molybdenum and rhenium in the products from the ion exchange column are shown below:

| Distribution | Distribution, percent | |
|---|---|---|
| | Mo | Re |
| Effluent | 79.4 | <0.1 |
| Sodium hydroxide eluate | 20.5 | |
| Perchloric acid eluate | 0.1 | >99.9 |

Example VIII

Two liters of solution assaying 9.70 grams rhenium per liter and 97.6 grams molybdenum per liter were fed to an Amberlite IRA-400 ion exchange resin column. More than 99.9 percent of the rhenium and 3.5 percent of the molybdenum were adsorbed by the resin.

Example IX

In another test, 3.4 liters of solution assaying 0.86 gram rhenium per liter and 64.5 grams molybdenum per liter were fed to an Amberlite IRA-400 ion exchange resin column. Again, more than 99.9 percent of the rhenium was adsorbed by the resin and only 2.2 percent of the molybdenum.

Example X

Forty liters of solution assaying 2.72 grams rhenium per liter and 56.0 grams molybdenum per liter were fed to a Dowex I ion exchange column. More than 99.9 percent of the rhenium was adsorbed and only 2.2 percent of the molybdenum.

Although the invention is here presented as applying particularly to the recovery of molybdenum values ordinarily lost when leaching a relatively impure molybdic oxide calcine to obtain technical grade molybdic oxide, it is apparent that any relatively impure molybdenum-bearing solution can be treated within the generic purview of the claims.

It should be noted that the laboratory tests for the solvent extraction stage, wherein various amines were utilized and the feed solution was at pH 1.5, led to lowering of the pH to at least 1.2 so as to achieve a cleaner and faster separation between the organic and aqueous phases.

Whereas there are here specifically set forth certain preferred procedures presently regarded as the best mode of carrying out the invention, it should be understood that various changes may be made and other procedures adopted without departing from the inventive subject matter particularly pointed out herebelow.

We claim:

1. A process for recovering molybdenum values from a pregnant acidic leach solution containing molybdic values in the highest valence state from relatively impure molybdic oxide calcine containing at least trace amounts of copper and iron, comprising the steps of:

(a) adjusting the pH of the pregnant leach solution to a value of at most pH 1.2;
(b) extracting the adjusted pregnant leach solution with an amine-containing extraction solution to separate the molybdenum values from the raffinate containing substantial portions of the contained copper and iron values;
(c) stripping the extracted molybdenum values with an ammonium compound to form an ammonium molybdate concentrate solution containing small amounts of residual copper and iron impurities;
(d) precipitating and removing the residual copper and iron impurities from the concentrate solution; and then
(e) crystallizing and separating the ammonium paramolybdate from the concentrated solution.

2. A process according to claim 7, wherein the copper values in the raffinate are precipitated from the raffinate and the copper precipitate is recovered.

3. A process according to claim 7, wherein residual copper values are recovered from the ammonium molybdate concentrate solution by adding a stoichiometric amount of soluble xanthate to said solution, and by then separating the resulting copper xanthate precipitate from said solution.

4. A process according to claim 3, wherein the ammonium molybdate concentrate solution is first heated to boiling to precipitate and coagulate iron values, and the xanthate is added following cooling of the solution.

5. A process according to claim 7, including the steps of obtaining the molybdic oxide calcine by calcining molybdenum sulfide metallurgical concentrate containing rhenium, of scrubbing the flue gases during the calcination of said concentrate to put volatilized rhenium values in solution, of oxidizing the rhenium to its highest valence, and of mixing the scrubber solution and the molybdic oxide leach solution to form a feed solution for the further processing steps.

6. A process according to claim 5, wherein rhenium and molybdenum values are separated from said concentrate solution containing rhenium and molybdenum values by subjecting said concentrate solution to an ion exchange procedure to remove the rhenium values from the concentrate solution and to produce an effluent containing the molybdenum values and the residual copper and iron impurities; wherein such effluent is then heated to precipitate and coagulate the iron values, and a soluble xanthate is added, after the solution has cooled, to precipitate the copper values; wherein the precipitated iron and copper values are separated from the molybdenum-containing solution; and wherein ammonium paramolybdate is crystallized from said molybdenum-containing solution.

References Cited

UNITED STATES PATENTS

| 2,202,525 | 5/1940 | Hixson et al. | |
| 2,809,092 | 10/1957 | Zimmerley et al. | 23—23 |
| 2,876,065 | 3/1959 | Zimmerley et al. | 23—51 |
| 2,972,531 | 2/1961 | Zimmerley et al. | 75—121 |
| 2,965,447 | 12/1960 | Zimmerley et al. | 23—23 X |
| 3,357,821 | 12/1967 | Henrickson | 75—121 X |

HERBERT T. CARTER, Primary Examiner

U.S. Cl X.R.

23—23, 24, 51; 75—121

PO-1050
(5/69)

UNITED STATES PATENT OFFICE
CERTIFICATE OF CORRECTION

Patent No. 3,458,277  Dated July 29, 1969

Inventor(s) Ronald N. Platzke and John D. Prater

It is certified that error appears in the above-identified patent and that said Letters Patent are hereby corrected as shown below:

Column 8, lines 17, 20, and 30, "claim 7" should read --Claim 1--.

SIGNED AND
SEALED
JAN 6 - 1970

(SEAL)
Attest:

Edward M. Fletcher, Jr.
Attesting Officer

WILLIAM E. SCHUYLER, JR.
Commissioner of Patents